Sept. 19, 1950     O. J. ALVAREZ     2,522,558
COOKING UTENSIL

Filed Dec. 21, 1946     4 Sheets-Sheet 1

INVENTOR.
Octavio Jose Alvarez
BY

Sept. 19, 1950          O. J. ALVAREZ          2,522,558
COOKING UTENSIL
Filed Dec. 21, 1946                                       4 Sheets-Sheet 2
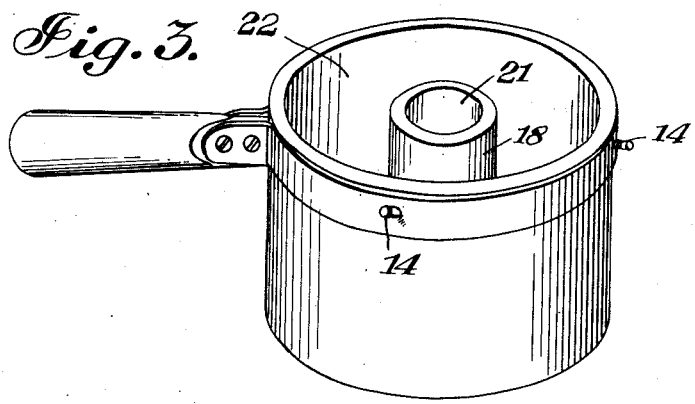
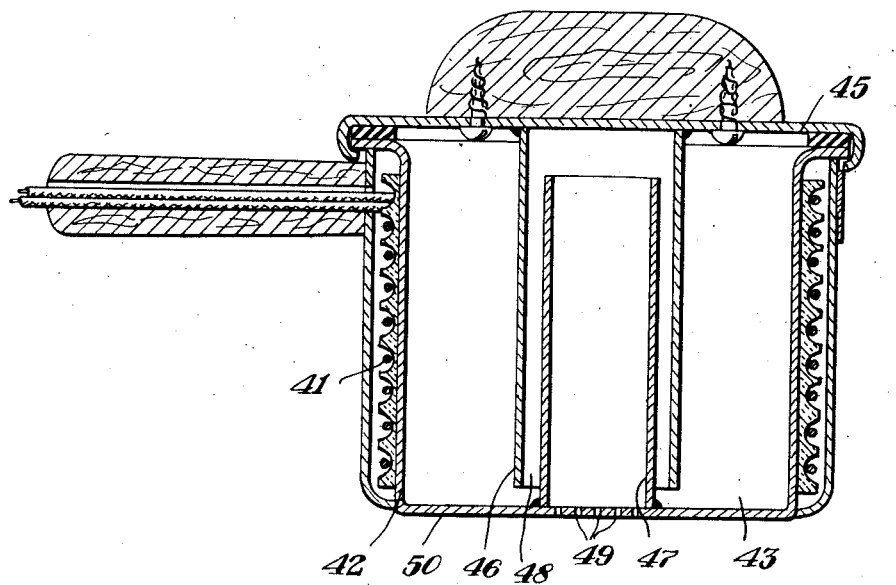
INVENTOR.
Octavio Jose Alvarez
BY Sept. 19, 1950  O. J. ALVAREZ  2,522,558
COOKING UTENSIL
Filed Dec. 21, 1946  4 Sheets-Sheet 3

INVENTOR.
Octavio Jose Alvarez
BY

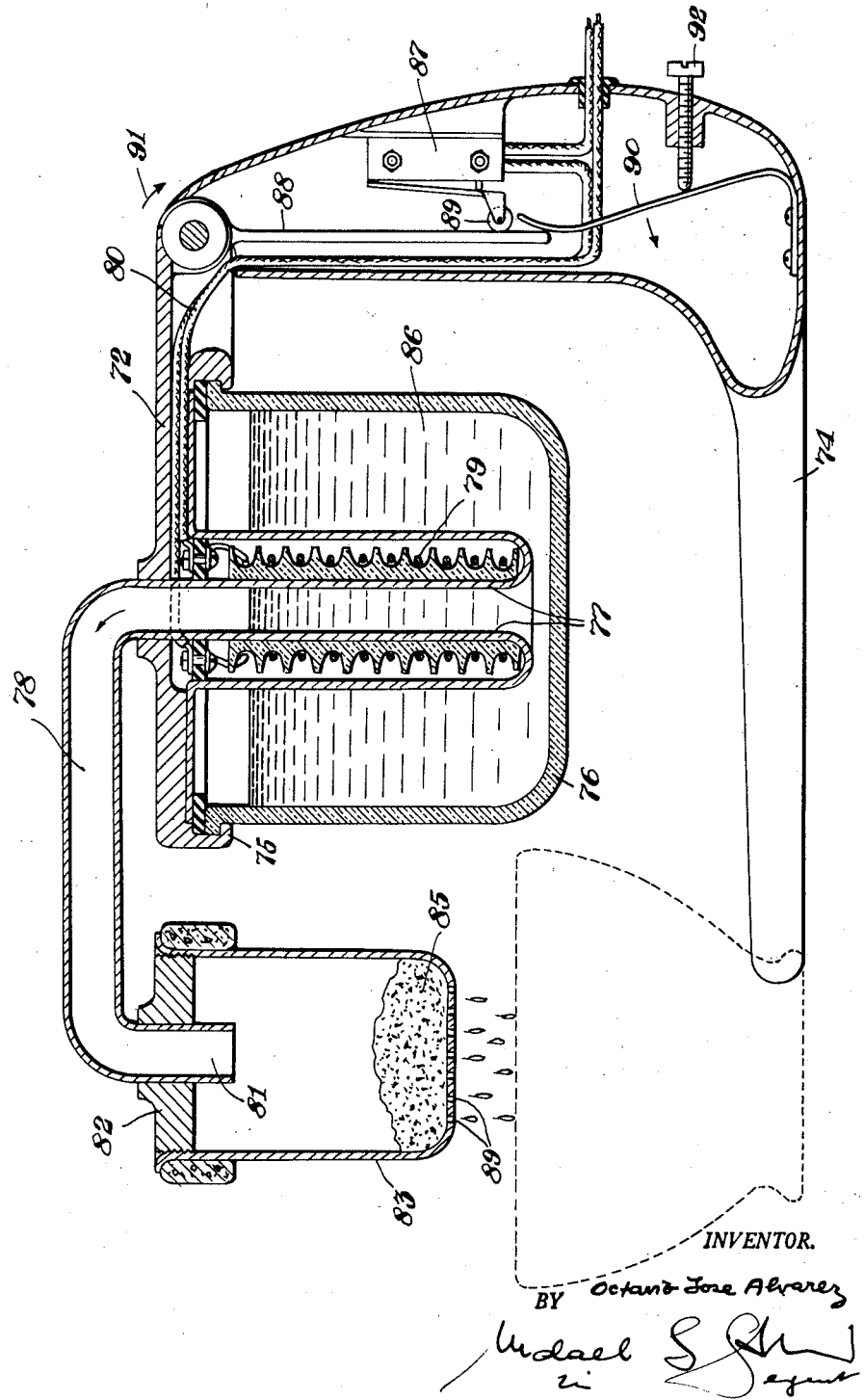

Patented Sept. 19, 1950

2,522,558

UNITED STATES PATENT OFFICE 2,522,558

COOKING UTENSIL

Octavio Jose Alvarez, New York, N. Y., assignor, by mesne assignments, of one-fourth to Maria de Reitzes-Marienwert, and three-fourths to Octavio J. Alvarez, both of New York, N. Y.

Application December 21, 1946, Serial No. 717,772

5 Claims. (Cl. 219—44)

My present invention relates to cooking utensils and more particularly to cooking devices for boiling water and making coffee or tea.

It is an object of my present invention to provide a cooking utensil with which it is possible to produce a continuous flow of boiling water.

Another object of my present invention consists in a device for making coffee or tea in which the vessel in which the boiling water is produced is separated from the container holding the coffee or tea so as to avoid the necessity of cleaning the vessel in which the water is boiled after each use.

With the above objects in view, my present invention mainly consists of a cooking utensil comprising in combination a cooking vessel having a bottom wall and being open at its top, a cover adapted to air-tightly close the open top of this cooking vessel, whenever desired, an opening arranged either in the wall of the cooking vessel or in the cover member mentioned above, conduit means being open at both ends and arranged within the cooking vessel defined above so as to reach from a point near the bottom wall of the cooking vessel to the above mentioned opening in the wall of the cooking vessel or the cover member, and heating means arranged so as to be adapted to heat fluid contained in the cooking vessel. Such heating will cause creation of steam within the cooking vessel which in turn will force the heated fluid through the conduit and the opening mentioned above.

The opening and/or the open end of the conduit are preferably combined with a filtering screen which is arranged removably so as to permit the introduction of coffee or tea into the open end of the conduit. The heated fluid, e. g. boiling water, passing through the conduit will be forced by the steam created in the cooking vessel under pressure through the coffee or tea and thus be transformed into a fluid coffee or tea beverage.

In accordance with a preferred embodiment of my present invention, the heating means mentioned above are arranged within the cooking vessel itself directly surrounding the conduit mentioned above so as to heat the water not only while it is within the cooking vessel itself but also while it passes through the conduit.

In accordance with a particularly preferred embodiment of my present invention, a cooking utensil for producing coffee, tea, or the like comprises in combination a cooking vessel, means for air-tightly closing this cooking vessel, a filtering vessel associated with this cooking vessel, filtering means forming at least part of the bottom wall of this filtering vessel, and a conduit which is open at both ends and reaches from a point inside the above defined cooking vessel near the bottom of the same to a point inside the above defined filtering vessel at or near the top of the same. Preferably, heating means are combined with the cooking vessel for heating the same. These heating means might be provided within the cooking vessel itself surrounding the conduit and heating the cooking vessel from inside, or they might be provided in the outer wall of the cooking vessel heating it from outside.

The filtering vessel mentioned above might form part of the cooking vessel itself; in this case, I provide dividing means, e. g. one or more dividing walls extending within the cooking vessel from the bottom wall of the same to a cover on top of the vessel so as to form within the cooking vessel two compartments, namely a heating compartment and a filtering compartment. A cooking utensil of this type is preferably equipped with a conduit which is open at both ends and reaches from a point inside the heating compartment near the bottom of the same to a point inside the filtering compartment at or near the top of the same. Of course, it is also necessary to provide heating means which are preferably arranged within the cooking vessel itself, surrounding the above mentioned conduit.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is a perspective view of the cooking vessel forming also part of the cooking utensil shown in Fig. 1;

Fig. 4 is a perspective view of the filter member forming also part of the cooking utensil shown in Fig. 1;

Fig. 5 is an elevational section through a modified cooking utensil according to my present invention similar to the one shown in Figs. 1 to 4;

Fig. 7 is an elevational section through still a further modified embodiment of the cooking utensil shown in Figs. 1 to 4.

Figure 1:
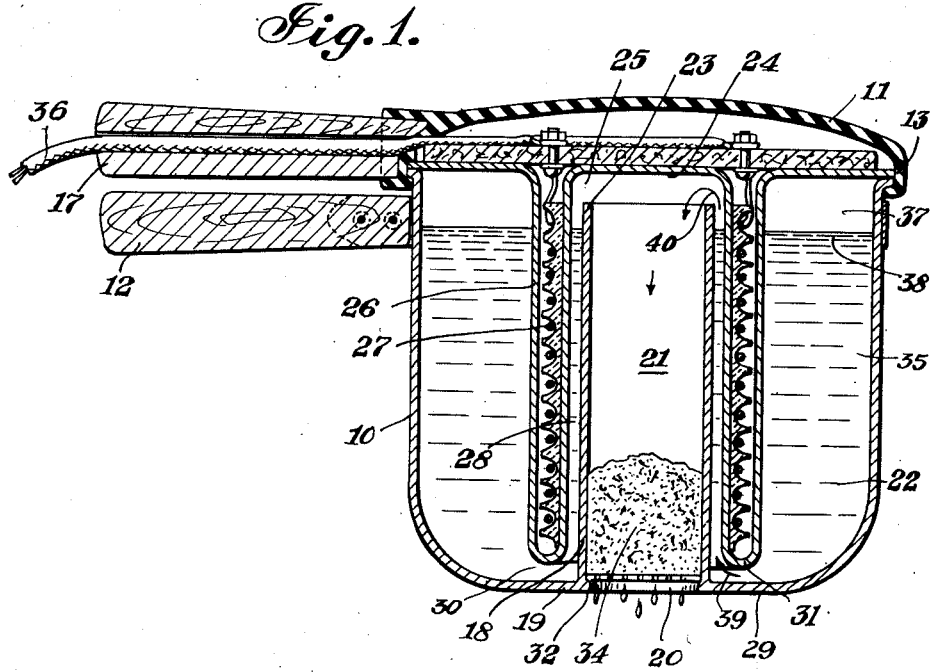
Fig. 1 is an elevational section through a cooking utensil according to my present invention.
Figure 2:
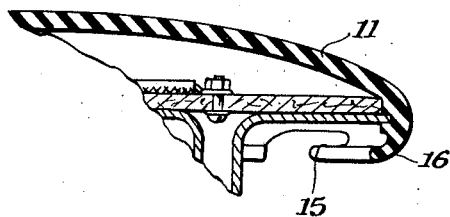
Fig. 2 is a partial elevational section through the cover forming part of the cooking utensil shown in Fig. 1.

The cooking utensil shown in Figs. 1 to 4 comprises as main parts the cooking vessel 10 and the cover member 11. The cooking vessel 10 is provided with a handle 12 and equipped along its upper edge 13 with small pins 14 adapted to engage corresponding slots 15 cut out in the rim 16 of cover 11. When pins 14 engage the slots 15 in cover 11, this cover is firmly secured to the cooking vessel 10, air-tightly closing the same.

Cover 11 is also provided with a handle 17 for holding it when it is removed from the top of the cooking vessel.

In accordance with a preferred embodiment of my present invention, I provide within the cooking vessel 10 a tubular wall 18 firmly secured to the bottom wall 19 around the opening 20 in the same. This tubular wall 18 forms within the cooking vessel 10 two compartments, namely an inner tubular filtering compartment 21 and an outer annular heating compartment 22 surrounding the tubular filtering compartment as clearly shown in Fig. 3.

The tubular wall 18 is arranged so that its top edge 23 does not reach the inner face 24 of cover 11, thus leaving a free space 25 between the top edge 23 and the inner face 24.

The cover 11 is provided, in accordance with my present invention, with a cylindrical inner wall portion 26 enclosing the heating element 27, as clearly shown in Fig. 1. This cylindrical wall portion 26 and heating element 27 are shaped so as to surround the tubular wall 18 leaving a conduit forming annular space 28 between the tubular wall 18 and the inner face of the cylindrical inner wall portion 26 of the cover 11. As clearly shown in Fig. 1, this inner cylindrical wall portion 26 does not extend to the bottom wall 29 of the cooking vessel 10, but leaves a free space 30 between its bottom edge 31 and the bottom wall 29 of the cooking vessel 10.

Thus, the conduit-shaped space 28 is connected at its bottom end with the bottom portion of the heating compartment 22 and at its top end with the top portion of the filtering compartment 21.

A projecting rim 32 is provided along the opening 20 so as to be adapted to support the filter screen 33 as shown in Fig. 1. This filter screen is inserted through the open top of the filtering compartment 21, whenever desired.

My above described cooking utensil operates when used for preparing coffee as follows:

First, the filter screen 33 is inserted into the filtering compartment so as to be supported by rim 32. Then ground coffee 34 is introduced into the filtering compartment and held there by the filter screen 33.

The next step consists in filling water 35 into the heating compartment 22, as shown. Thereafter, the cover 11 is placed on the cooking vessel 10 and air-tightly closed as shown in Fig. 1. In this position, the coffee maker is ready for preparation of coffee: For this purpose, the heating element 27 is connected by means of conductor 36 with a source of electric current. The heating element 27 will then heat the water 35 contained in the heating compartment 22 and create steam which will rise in the water and accumulate in the air space 37 above the water level 38. This steam will exert a pressure and force the heated water in direction of arrow 39 into the annular conduit 28 and through the same in direction of arrow 40 into the tubular filtering compartment 21.

During its passage through the annular conduit 28 and partly also during its passage through the filtering compartment 21, the water will be still further heated and transformed into a water-steam mixture which will be forced by the pressure caused by the steam expanding within the air space 37 through the ground coffee 34 and the holes in the filter screen 33. During this passage through the ground coffee 34, the hot water-steam mixture will be transformed into liquid coffee.

I wish to note that, as clearly shown in the drawings, the heating element 27 is partly heating also the ground coffee 34 itself so that the same is preheated when the water is forced through it.

Furthermore, I wish to note that the heating element 27 is arranged so that its surface portion heating the water 35 in the heating compartment 22 decreases proportionately to the decreasing water amount in this compartment. Thus, the water 35 in compartment 22 is always exposed to the same amount of heat.

The coffee maker shown in Fig. 5 is very similar to the one shown in Figs. 1 to 4. Therefore, I will not describe it in detail but explain only those portions of the same which differ from the above described coffee maker:

The main characteristic difference between this coffee maker and the one shown in Figs. 1 to 4 is that the heating coil 41 is arranged within the outer wall 42 of the cooking vessel 43 and does not form part of the cover 45. The cover is only provided with the cylindrical wall 46 surrounding the tubular wall 47 as shown, forming between these walls the annular conduit 48.

A further feature of this coffee maker is that no separate filter member 33 is employed, but that the filter holes 49 are provided directly in the bottom wall 50 of the cooking vessel 43.

In all other respects, this coffee maker is identical with the coffee maker shown in Figs. 1 to 4 and described above and it operates also in exactly the same way as that coffee maker.

Figure 6:
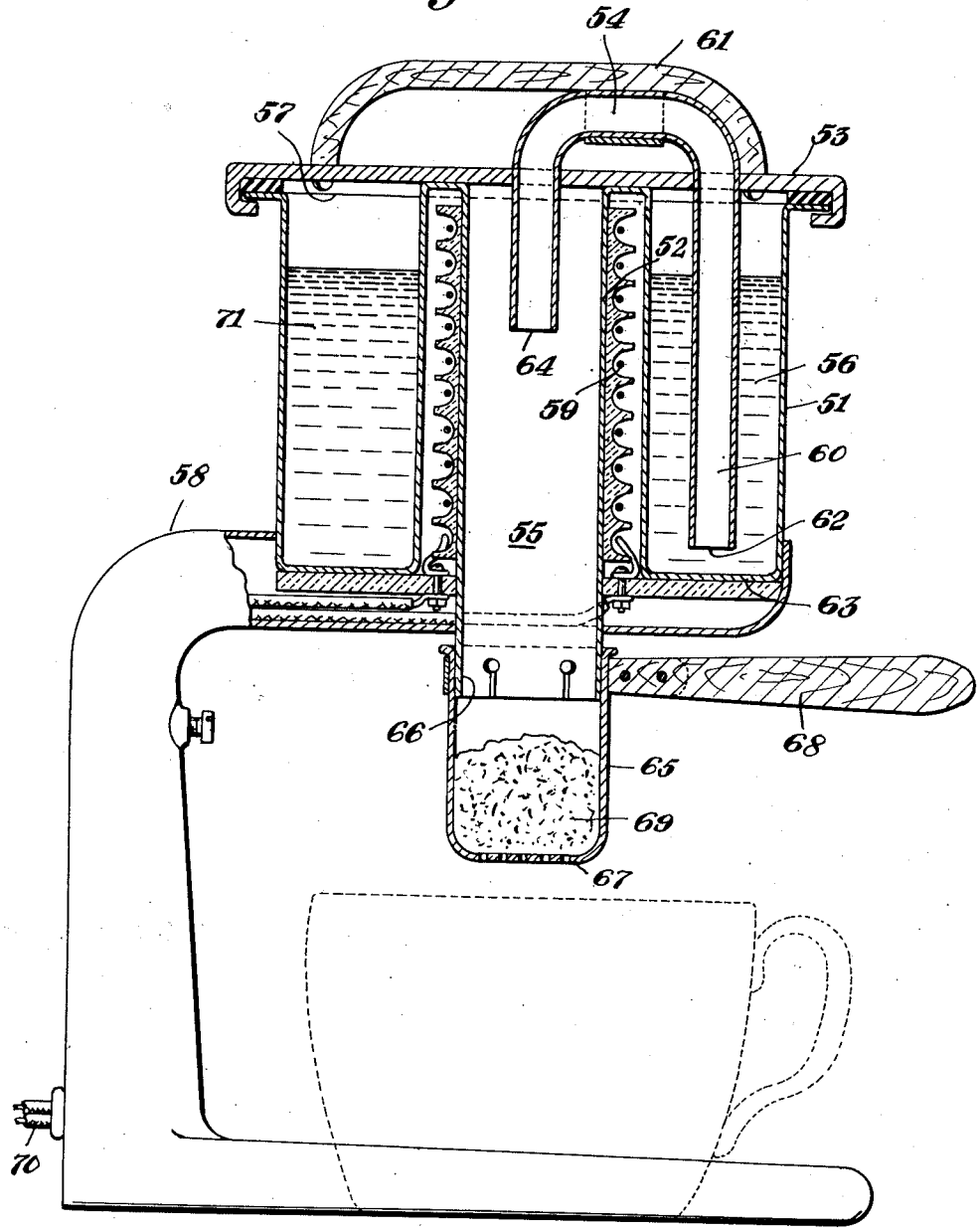
Fig. 6 is an elevational section through still another modification of the cooking utensil shown in Figs. 1 to 4.

The modified coffee maker shown in Fig. 6 differs in several respects from the two coffee makers described above: The cooking vessel 51 of this coffee maker is firmly supported by bracket 58 supporting it as shown. Furthermore, the tubular wall 52 does not leave a free space between its upper edge and cover 53 but extends to this cover abutting against the rubber gasket 54 secured to the same. Thus, the tubular filtering compartment 55 formed by the tubular wall 52 is entirely separated from the heating compartment 56 when the cover 53 is placed on the open top 57 of cooking vessel 51, air-tightly closing the same.

The cylindrical heating element 59 is combined with the tubular wall 52, as shown, and adapted to heat simultaneously both the heating compartment 56 and the filtering compartment 55.

In order to permit passage of boiling water from the heating compartment 56 into the filtering compartment 55, as necessary in accordance with my present invention, I provide the bent tubular member 60 passing through the handle 61 of the cover 53 and being firmly secured to the same. The outer bottom end 62 of this tubular member 60 reaches nearly to the bottom wall 63 of the cooking vessel 51. The inner bottom end 64 of the bent tubular member 60 reaches into the filtering compartment at the top end of the same, as shown.

This coffee maker is not equipped with filtering means at the bottom of the tubular wall 52, but a separate cup-shaped container 65 can be slipped over the bottom portion 66 of the tubular wall 52, as shown. This cup-shaped container is provided with filtering openings 67 and handle 68 and contains the coffee 69.

When the heating coil 59 is connected by means of conductor 70 with a source of electric current, it will heat the water 71 contained in the heating compartment 66 and the same will be forced into and through the bent tubular member 60 dripping into the filtering compartment 55 and onto the coffee 69.

The modified coffee maker shown in Fig. 7 is equipped with a cover member 72 pivoted by means of pivot 73 to the supporting bracket 74, and provided with a rim portion 75 adapted to detachably hold the cooking vessel 76. Furthermore, the cover member 72 is also provided with a tubular wall 77 reaching into the cooking vessel 76 and combined with the tubular conduit 78 arranged as shown.

The tubular wall 77 reaching into the cooking vessel 76 is surrounded by a tubular heating element 79 connected with the conductors 80.

The tubular conduit 78 mentioned above has a downwardly bent end portion 81 over which the rubber cover 82 of the coffee containing cup member 83 might be slipped as shown in the drawings. This cup member 83 is provided at its bottom with filtering holes 84 and adapted to contain the coffee 85.

This coffee maker operates as follows:

First, coffee 85 is placed into the cup member 83 and the same attached to the end portion 81 of the tubular conduit 78, as shown. Then, the cooking vessel 76 is nearly entirely filled with water 86 and secured to the cover member 72. Thereafter, the conductors 80 are connected with a source of electric current. The water 86 is thus heated by the heating element 79 and will be forced by the created steam, for the reasons explained above in detail, through the conduit 78 into the cup member 83 and there transformed into liquid coffee.

This coffee maker is equipped with means for automatically disconnecting the heating element 79 from the source of electric current when nearly all water 86 has been forced from the cooking vessel 78. This means consists of switch 87 included in one of the conductors 80, a lever 88 forming part of the cover member 72 and the switch operating member 89 operated by this lever and adapted to operate switch 87. I combine with the above switch means also a spring 90 which is adapted to press against the lever 88 tending to turn the same together with cover 72 and vessel 76 in direction of arrow 91. This spring 90 is adjusted by means of screw 92 so as to be adapted to turn lever 88 together with the entire cooking arrangement when there is no water in vessel 76 into such a position that the switch 87 is open and the heating coil 79 disconnected from the source of electric current. When, however, there is water in the cooking vessel 76, the weight of the same will turn the entire cooking arrangement about pivot 73 contrary to direction of arrow 91 resulting in closing of switch 87 and connection of the heating coil 79 with the source of electric current.

It is evident that this switch arrangement will operate so as to connect the heating coil 79 with the source of electric current when there is water in the cooking vessel 76 and to disconnect it automatically when the water has been forced from this vessel through conduit 78 into the cup member 83 and from there through the filtering holes 84 into a cup placed under the cup member, thereby substantially reducing the weight of the entire cooking arrangement and permitting spring 90 to turn it into switch opening position, disconnecting the heating element 79 from the source of electric current.

It will be understood that each of the elements described above, or two or more together, may also find a useful application in other types of cooking utensils, differing from the types described above.

While I have illustrated and described the invention as embodied in cooking utensils for preparation of coffee, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. A cooking utensil comprising in combination a cooking vessel being open at its top; cover means for air-tightly closing said open top of said cooking vessel, whenever desired; tubular wall means arranged within said cooking vessel extending from the bottom to the top of the same and forming within said cooking vessel a tubular filtering compartment and an annular heating compartment surrounding said tubular filtering compartment; at least one opening at the bottom of said tubular filtering compartment; heating means arranged within said cooking utensil incorporated in said tubular wall means for simultaneously heating said annular heating compartment and said tubular filtering compartment; and a conduit being open at both ends and reaching from a point inside said annular heating compartment near the bottom of the same to a point inside said tubular filtering compartment at or near the top of the same.

2. A cooking utensil comprising in combination a cooking vessel being open at its top; cover means for air-tightly closing said open top of said cooking vessel, whenever desired; a first tubular wall arranged within said cooking vessel extending from the bottom of the same nearly to said cover means so as to leave a free space between the top of said first tubular wall and said cover means and to form within said cooking vessel a tubular filtering compartment and an annular heating compartment surrounding said tubular filtering compartment; a second tubular wall having a slightly greater diameter than said first tubular wall and arranged within said cooking vessel surrounding said first tubular wall and extending from said cover means nearly to the bottom of said cooking vessel so as to leave a free space between the bottom of said second tubular wall and said bottom wall of said cooking vessel; a conduit formed by and between said tubular walls so as to connect the bottom portion of said annular heating compartment with the top portion of said tubular filtering compartment; cylindrical heating means incorporated in said second tubular wall for simultaneously heating said annular heating compartment, said conduit formed by and between said tubular walls and said tubular filtering compartment; and filtering openings arranged in the bottom of said tubular filtering compartment.

3. A cooking utensil comprising in combination a cooking vessel being open at its top; cover means for air-tightly closing said open top of said cooking vessel, whenever desired; a first tubular wall arranged within said cooking vessel secured to the bottom wall of the same and extending therefrom nearly to said cover means so as to leave a free space between the top of said first tubular wall and said cover means and to form within said cooking vessel a tubular filtering compartment and an annular heating compartment surrounding said tubular filtering compartment; a second tubular wall having a slightly greater diameter than said first tubular wall and secured to said cover means so as to surround said first tubular wall and extend from said cover means nearly to the bottom of said cooking vessel so as to leave a free space between the bottom of said second tubular wall and said bottom wall of said cooking vessel; a conduit formed by and between said tubular walls so as to connect the bottom portion of said annular heating compartment with the top portion of said tubular filtering compartment; heating means incorporated in one of said tubular walls for simultaneously heating said annular heating compartment, said conduit formed by and between said tubular walls and said tubular filtering compartment; and filtering openings arranged in the bottom of said tubular filtering compartment.

4. A cooking utensil comprising in combination a cooking vessel being open at its top; cover means for air-tightly closing said open top of said cooking vessel, whenever desired; a first tubular wall being open at both ends and passing through the bottom wall of said cooking vessel secured to the same and extending at least from said bottom wall of said cooking vessel to a point near said cover means so as to leave a free space between the open top of said first tubular wall and said cover means and to form within said cooking vessel a tubular filtering compartment and an annular heating compartment surrounding said tubular filtering compartment; a second tubular wall having a slightly greater diameter than said first tubular wall and arranged within said cooking vessel surrounding said first tubular wall and extending from said cover means nearly to the bottom of said cooking vessel so as to leave a free space between the bottom of said second tubular wall and said bottom wall of said cooking vessel; a conduit formed by and between said tubular walls so as to connect the bottom portion of said annular heating compartment with the top portion of said tubular filtering compartment; and heating means incorporated in one of said tubular walls for simultaneously heating said annular heating compartment and said tubular filtering compartment.

5. A cooking utensil comprising in combination a cooking vessel having a bottom wall and being open at its top; cover means for air-tightly closing said open top of said cooking vessel; whenever desired; an opening in said bottom wall of said cooking vessel; a first tubular wall arranged within said cooking vessel secured to said bottom wall of the same around said opening and extending from said bottom wall to a point near said cover means and forming within said cooking vessel a tubular filtering compartment being open at both its bottom and top and an annular heating compartment surrounding said tubular filtering compartment; a second tubular wall having a slightly greater diameter than said first tubular wall and secured to said cover means so as to surround said first tubular wall and extend from said cover means to a point near said bottom wall of said cooking vessel; a conduit formed by and between said tubular walls so as to connect the bottom portion of said annular heating compartment with the open top of said tubular filtering compartment; cylindrical heating means incorporated in said second tubular wall for heating simultaneously said annular heating compartment, said conduit and said tubular filtering compartment; and a filtering screen arranged at the bottom of said tubular filtering compartment covering said opening in the bottom wall of said cooking vessel.

OCTAVIO JOSE ALVAREZ.

REFERENCES CITED

The following references are of record in the file of this patent:

UNITED STATES PATENTS

| Number | Name | Date |
|---|---|---|
| 1,092,523 | Falkenberg | Apr. 7, 1914 |
| 1,268,848 | Jacobs et al. | June 11, 1918 |
| 1,379,671 | Abtmeyer | May 31, 1921 |
| 1,782,958 | Dym | Nov. 25, 1930 |
| 1,892,106 | Jancke | Dec. 27, 1932 |
| 1,917,071 | Smith | July 4, 1933 |
| 1,962,165 | Wilcox | June 12, 1934 |